United States Patent [19]

Meadows

[11] Patent Number: 4,914,432
[45] Date of Patent: Apr. 3, 1990

[54] APPARATUS FOR LOCATING A MEMBER IN A BOREHOLE

[75] Inventor: Alan Meadows, Stretton, England

[73] Assignee: Coal Industry (Patents) Limited, London, England

[21] Appl. No.: 376,584

[22] Filed: Jul. 7, 1989

Related U.S. Application Data

[62] Division of Ser. No. 281,857, Dec. 9, 1988, Pat. No. 4,879,695.

[30] Foreign Application Priority Data

Jan. 28, 1988 [GB] United Kingdom ............... 8801881

[51] Int. Cl.<sup>4</sup> .......................................... G01V 1/00
[52] U.S. Cl. ............................ 340/853; 166/250; 166/383; 166/153; 367/25; 367/911
[58] Field of Search ................. 340/853, 856, 857; 181/101, 102; 367/911, 81, 25; 175/40; 166/250, 381, 383, 66, 153

[56] References Cited

U.S. PATENT DOCUMENTS

| | | | |
|---|---|---|---|
| 4,418,756 | 12/1983 | Yonker et al. | 166/383 |
| 4,560,934 | 12/1985 | Dickinson | 175/40 |
| 4,570,709 | 2/1986 | Wittrisch | 166/384 |
| 4,690,214 | 9/1987 | Wittrisch | 166/250 |
| 4,697,638 | 10/1987 | Knight | 166/250 |
| 4,729,429 | 3/1988 | Wittrisch | 166/383 |

*Primary Examiner*—Deborah L. Kyle
*Assistant Examiner*—J. Woodrow Eldred
*Attorney, Agent, or Firm*—James Creighton Wray

[57] ABSTRACT

Geophone detectors are spaced along a long borehole in a mineral seam by pumping grout from a grout tank into a breech assembly and selectively passing the detectors from the breech assembly through gate valves and into a drill string inserted in a borehole. The detectors are connected by a trailing signal cable and an anchor module secures the cable at the far end of the borehole. The detectors can be orientated in the borehole before the grout sets them in position.

29 Claims, 3 Drawing Sheets

APPARATUS FOR LOCATING A MEMBER IN A BOREHOLE

This is a division of application Ser. No. 281,857, filed Dec. 9, 1988, now U.S. Pat. No. 4,879,695.

BACKGROUND OF THE INVENTION

1. Field of the Invention

This invention relates to a method of locating a member in a borehole and is particularly, but not exclusively, concerned with boreholes which are substantially horizontal and have been drilled in seams such as coal seams. The invention is however able to be applied to boreholes at different dispositions without departing from the principles of the method.

2. Prior Art

In many mining applications it is a feature of the mining operation to determine the quality of a mineral such as coal in a seam well ahead of the extraction process. This is done to ensure the quality of the seam and to make sure that it is regular and that no faults or dirt inclusions are ahead of the mining operation. With an advance knowledge of the quality of the seam being mined, mine managers can plan their production in a most effective and efficient way to ensure the maximum extraction of useful wanted material. One method of assessing the quality of the seam currently in use, is to use an in-seam seismic system where a long borehole, typically up to a 1000 m in length, is drilled along one edge of a panel in the seam and a parallel borehole is drilled at the other edge of the panel. In the first borehole noise sources such as exploders are situated and in the second hole detectors such as geophones are positioned at known spaced distances. When the noise from the sources is transmitted through the area of the seam between the two boreholes the noise wave is attenuated according to the quality of the seam and any faults or foreign matter in the seam can cause a deflection on the wave received. The received wave is converted by the geophone into electrical signals which are transmitted over a cable to a remotely positioned recorder where the information is recorded and then analysed using computer techniques.

One of the problems which exists is to ensure that the detectors are spaced at the correct positions along the borehole and since these boreholes are very narrow, typically 3 inches in diameter, it is apparent that there is not much room for manoeuvring the detectors.

It is an object of the present invention to provide a method of locating a member in a borehole which enables the member or plurality of members to be spaced accurately within the borehole in both the correct location and orientation.

SUMMARY OF THE INVENTION

According to the present invention, a method of locating a member in a borehole comprises inserting a tubular open ended casing into the borehole with part of the casing extending outside of the borehole, filling the borehole casing with a slow setting grout by pumping the grout down the center of the casing until the grout flows back out of the annulus formed between the outside of the casing and the borehole wall, fitting a breech assembly to the part of the casing extending beyond the borehole, inserting an anchor module connected to one end of a steel stress cable into the breech assembly, pumping more grout into the casing so as to convey the anchor and the steel stress cable into the casing, connecting a member to the steel stress cable, entering it into the breech assembly and continuing pumping grout so as to convey the member With the attached signal cable into the casing, the pumping being continued until the anchor passes from the distal end of the casing and is secured in the remote end of the borehole.

There are preferably a plurality of members attached to the cable at desired distances along its length and these are successively drawn into the borehole as pumping continues. The grout is arranged to be pumped in a preferred method down the center of the casing and excess grout returns via the annulus formed between the outside of the casing and the wall of the borehole.

Preferably the breech assembly comprises a tubular part having a first valve member at one end adapted in use to be connected to the casing and a second valve member connected to its other end. The valve members preferably each have a pair of centrally engaging jaws, and these jaws may, when engaged, define a central aperture through which the cable can pass. The jaws may be arranged to be operated either manually or automatically.

The members are typically detectors such as geophones and each member can include inclinometer means to determine the orientation of the member. Motor means may also be included to enable the orientation of the member to be varied within the borehole. There may be sealing means associated with each member and the sealing means may allow a substantial leakage of grout past the member. There may also be provided anti-rotation means which can include spring-loaded stabilisation elements to ensure that once the rotation and orientation of the member is correct it does not vary.

The anchor module preferably includes spring-loaded arms arranged to be deflected when the module is moved in a preferred direction of travel through the casing and to open out on emerging from the casing to grip a surrounding wall to resist movement in a direction of travel opposite to the said preferred direction. The spring-loaded arms may comprise two sets of arms spaced apart along a rigid member of the anchor means. The seal means may include pumping seal means and may further include a ball valve which when operated allows the seal means to be bypassed.

In order that the invention may be readily understood, one example of using the method of the invention by placing a line of geophones in a long borehole in a coal seam will now be described with reference to the four figures of the accompanying drawings.

DETAILED DESCRIPTION OF THE DRAWINGS

Figure 1:
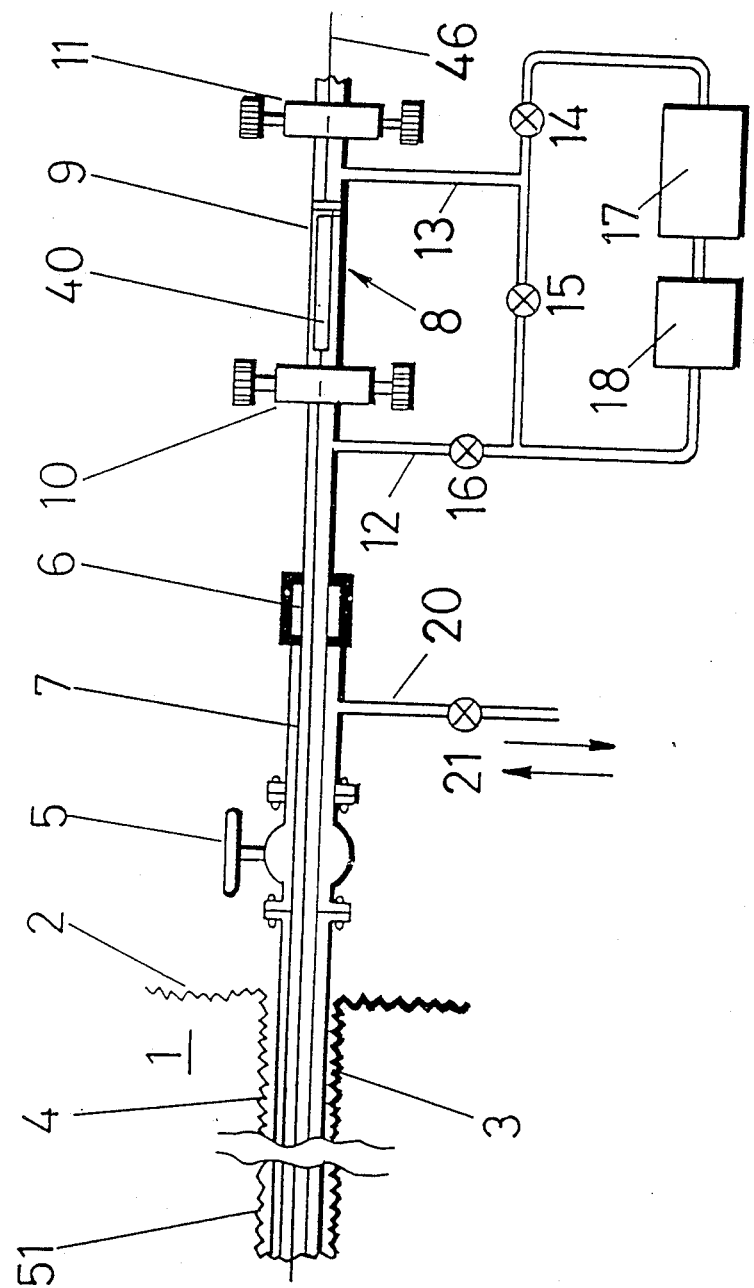
FIG. 1 shows the general layout of the grouting system for introducing grout and the geophones into a borehole.

Referring firstly to FIG. 1 of the drawings, this shows a coal seam (1) having a face (2) through which a borehole (3) of about a 1000 m in length has been drilled in a substantially horizontal orientation. A tubular casing or standpipe (4) is inserted into the borehole (3) and cemented to the borehole. Part 4 of the standpipe extends beyond the face (2) of the seam (1) and connects to a shut off valve (5) and terminates in a stuffing box seal (6) through which drill pipes (7) pass. A breech assembly is shown generally at (8), this includes a tubular member (9) having a closeable aperture which allows access to the tubular member, and two gate valves (10) and (11). Two pipes (12) and (13) through which grout can be introduced and discharged from the drill pipes breech assembly as required are connected as shown and link through a piping circuit and valves (14), (15), (16) in a grout circuit connecting to a tank (17) and a grout pump (18). A further pipe (20) is connected to the standpipe (4), and the flow of grout into and out of the standpipe (4) is controlled by a valve (21).

Figure 2:
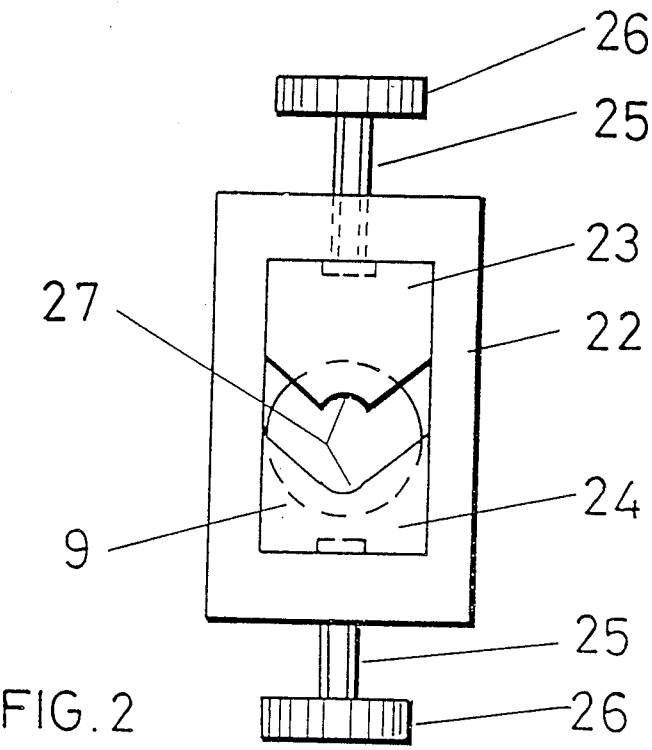
FIG. 2 shows the detail of a gate valve for a breech assembly.

Referring now also to FIG. 2, this shows a detail of the gate valves (10) and (11). Basically the valves comprise a slideway (22) having two plates (23), (24) which can be moved towards each other manually through hand operated screwed rods (25). The rods (25) have knurled operating portions (26) at their ends. The plates (23), (24) are of a mating V formation except that each have has a substantially semi-circular profile (27) which when the plates (23), (24) engage defines the circular aperture. The gates can be opened so that the plates (23) and (24) fully clear the diameter of the tubular part (9).

Figure 3:
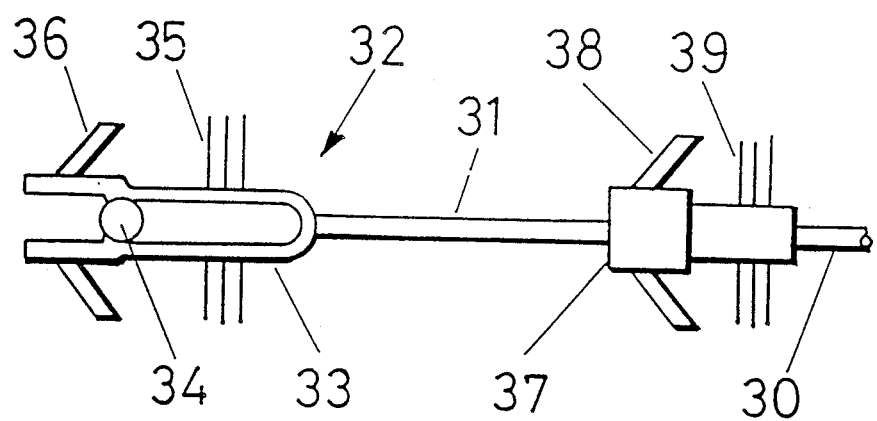
FIG. 3 shows the details of an anchor module and FIG. 4 shows the details of a geophone module.

Referring now to FIG. 3, this shows an anchor module which is used to lead a steel rope (30) into the borehole (3). The module comprises two parts joined by a steel rod at (31). The leading part (32) comprises a hollow body (33) having a ball valve (34) in it and pump up seals (35) secured to its outside, unless a motor drive orientation device is to be fitted as will be explained below. Spring-loaded arms (36) are fixed at the leading end of the part (32) and these arms (36) are biased into the normally open position as shown, although they can be deflected downwards to lie along the side of the body (33). At the other end of the rod (31) a trailing part (37) of the module is provided with arms (38) similar to the arms (36) and, if required, pump up seals (39) similar to the seals (35).

Figure 4:
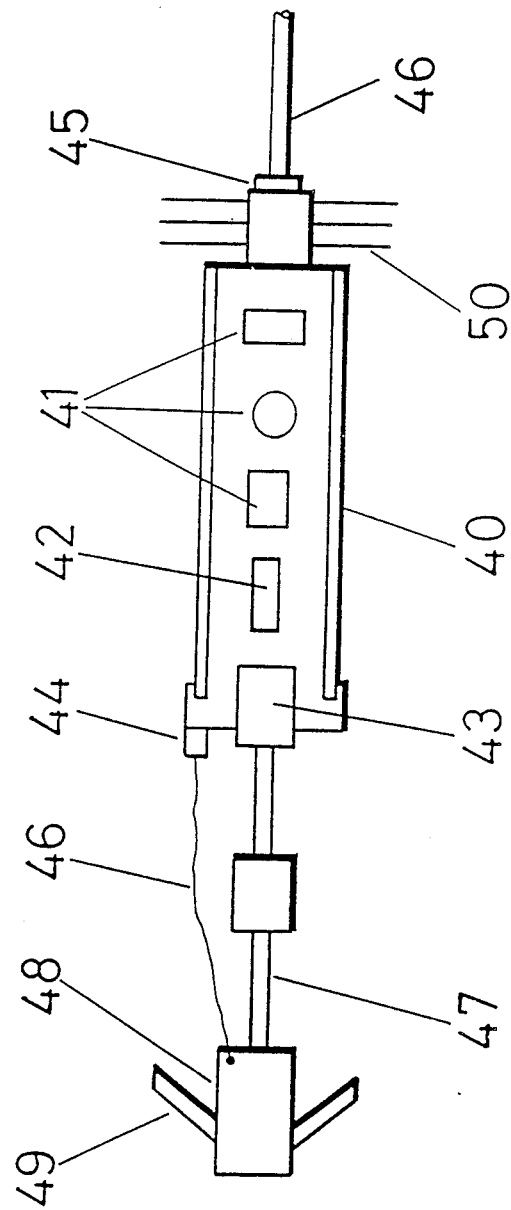

The detectors used in the seismic system are shown in more detail in FIG. 4 to which reference is now made. A detector comprises generally a body (40) which includes a plurality of geophone inserts (41), an inclinometer (42) and a motor (43) including a gear box which gives a speed of revolution of one revolution per minute. Cable clamps (44), (45) are attached to the body (40) and secure a geophone signal cable which carries information from the geophones to external recording equipment (not shown). This signal cable is indicated at (46). The rotor (43) is connected through a rod (47) to an anti-rotation anchor (48) which has spring-loaded whiskers (49) attached to it which are of a similar construction to the spring-loaded arms (36), (38) on the anchor module. Leaky seals (50) may be fitted behind the body (40) on the cable clamp if orientation of the module is to be effected other than by a motor drive unit.

The operation of the method is as follows. A borehole (3) is first drilled into the seam (1) and the drill string is then removed. The standpipe (4) is inserted into the mouth of the hole and cemented in an open throated casing at (51) (FIG. 1). If the hole has any diversions, a slightly bent sub may be inserted immediately behind the standpipe to assist in re-entry into a branch. The end (4) of the standpipe is left projecting beyond the face (2) and this is coupled up to the shut off valve (5) and to the grout tank via pipe (20) and valve (21). The drill pipes (7) pass into the hole down the casing and connect with assembly (8) through stuffing box seal (6). A slow setting cement grout is then pumped down the inside of the drill string (7) via pipe (12) until the borehole is completely filled with grout and grout is coming up to the annulus between the standpipe (4) and the drill pipe (7) and surplus grout is taken out via pipe (20) and valve (21). The anchor module as shown in FIG. 3 is inserted into the body of the breech assembly (8) with the spring-loaded arms (36) and (38) pulled into the side of the casing and with the steel rope (30) extending through gate valve (10) and with the gate valve (11) closed. Gate valve (10) is in the open condition, and grout is passed into the breech assembly (8) from the tank (17) via valve (14) which is open while valves (15) and (16) are closed.

The effect of pumping the grout into the breech assembly is to cause the anchor module to pass into the casing (4) and pumping continues until the module is a short distance into the casing. As the module moves it pulls the steel rope (30) with it. The gate valve (10) is now closed and valve (11) is open. The steel rope (30) is connected to the first of the geophone modules and valve (15,16) are opened with valve (14) closed, so that some grout from the tank (17) can be pumped into the casing to move the anchor module further down the casing and in a controlled manner pulls the geophone module into the breech assembly to a position as shown in FIG. 1.

The gate valve (11) is then closed and the gate valve (10) opened and with the grout valves (15,16) closed and valve (13) open, grout is pumped into the borehole with the effect that the anchor module progresses dragging with it the geophone module (40). With gate valve (11) closed and gate valve (10) opened air trapped into the breech assembly is swept out and, when the geophone module has passed gate valve (10), the valve (13) is shut which allows pressure to build up in the casing and the module to be moved along. The second geophone module (not shown) which is attached to the geophone cable (46) is then allowed to enter the breech assembly via gate valve (11) and the operation continues with pumping slowly taking place until the second module is in position. Gate valve (11) is then closed and gate valve (10) opened and pumping continues as before.

This procedure is completed for all the geophone modules which have to be inserted into the borehole and when they are all through the breech assembly, grout pumping continues until the anchor module reaches the end of the standpipe and emerges into the borehole. The use of the seals (35) and (39) ensure that the hole of the anchor module proceeds out of the standpipe (4) and into the borehole (3) at its distal end.

Since the arms (36) and (38) of the anchor module are spring-loaded, when they are no longer constrained by the standpipe (4) they move outwardly until they engage the wall of the borehole. Due to their angled nature if tension is applied to the steel rope (30) the anchor module will grip against the side of the borehole and the cable will go into tension. This is done so that the whole of the geophone array is correctly spaced. In the anchor module the ball valve (34) opens when the anchor module is pushed into the grout filled breech. The grout thus flows freely past the seal through the central orifice so that little resistance is met. However when pumping commences the ball valve (34) is forced shut and so the pump-up seals then become effective.

With the anchor module in its correct position and the cable in tension only a short length of geophone cable of about 1 or 2 meters will be left protruding from the end of the standpipe (4) beyond the face. This length which is about 1 or 2 meters is calculated when the borehole is drilled.

The breech assembly is then removed from the drill pipe and the drill pipe (7) in its normal drill size length is withdrawn for use in the next borehole. Since there is only a short length of geophone cable extending the removal of the lengths of drill pipe present a simple and easy task.

The removal of the drill pipe (7) does leave some space within the borehole and this is topped up by further pumping grout into the borehole through pipe (20) and valve (21) while maintaining the tension on the geophone cable (46) and the anchor module.

It is important that the geophone modules are correctly orientated within the borehole since disorientation will most probably occur and it is thus necessary to rotate the string of modules until the correct orientation is achieved. It is generally necessary for individual modules to be orientated independently of the others in the string and this is able to be done by monitoring by virtue of the inclinometer (42) in each module the exact position of the geophone inserts (41). The leaky seals (35,39) are important for the correct orientation to be achieved by rotation of the entire drill string of pipes (7) when a motor drive unit is not incorporated. The leaky seals in this case provide the necessary grip between the drill pipes (7) and the geophone modules (40). The seals are made to be substantially leaky so that there is little or no pumping action experienced by the modules otherwise the cable (46) might tend to become slack between modules and could even bunch and become tangled inside the string. The precise knowledge of the inter-module spacing would then be lost. The quality of leakiness guarantees that only the anchor module experiences substantial pumping forces and, provided that the cable is kept in tension, the modules are correctly spaced. The orientation is carried out immediately before the module emerges from the end of the string. This is achieved by rotating the string—usually by hand with a wrench. The leaky seals provide the necessary grip between the module and the drill pipes. No seals (35,39) are required if orientation adjustment is to be provided by the motor (43). When this motor is operated, and with the spring-loaded whiskers (49) of the anti-rotation anchor of the module engaging in the wall of the bore, the body (40) of the module is able to be rotated in a desired direction until the inclinometer reading indicates a correct orientation for the inserts (41). The geophone cable (46) can be connected up to recording and analyzing instrumentation and once the slow setting grout has set the system is ready for use.

The use of the method of the invention enables the string of geophones to be accurately positioned and spaced along a long borehole and also to be correctly orientated. This ensures that information derived from the geophone modules is not distorted by the incorrect positioning or orientation of the geophone insert (41).

I claim:

1. Apparatus for locating a member in a borehole comprising a tubular open ended casing inserted into the borehole with part of the casing extending outside of the borehole, a pump for filling the borehole casing with a slow setting grout by pumping the grout down the center of the casing until the grout flows back out of an annulus formed between the outside of the casing and the borehole wall, a breech assembly fitted to the part of the casing extending beyond the borehole, an anchor module connected to one end of a rope for inserting into the breech assembly before pumping more grout into the casing so as to convey the anchor and the rope into the casing, a member connected to the rope, and a signal cable connected to the member for entering the member into the breech assembly and continuing pumping grout so as to convey the member with an attached signal cable into the casing, the pumping being continued until the anchor module passes from the distal end of the casing and is secured in the downhole end of the borehole.

2. Apparatus as claimed in claim 1 and including a plurality of members attached to the signal cable at required distances along its length for successively drawing said members into the borehole as pumping continues.

3. Apparatus as claimed in claim 1 wherein the breech assembly comprises a tubular part having a first valve member at one end adapted in use to be connected to the casing and a second valve member connected to its other end.

4. Apparatus as claimed in claim 3 wherein each valve member has a pair of centrally engaging jaws.

5. Apparatus as claimed in claim 3 wherein each valve member includes a pair of jaws which, when engaged provide a central aperture through which the signal cable is arranged to pass.

6. Apparatus as claimed in claim 3 wherein each valve member includes a pair of jaws arranged to be manually operated by means of a threaded rod.

7. Apparatus as claimed in claim 1 wherein the member is a geophone.

8. Apparatus as claimed in claim 7 wherein the member includes inclinometer means to determine the orientation of said member.

9. Apparatus as claimed in claim 7 wherein the member includes leaky seals.

10. Apparatus as claimed in claim 7 and including means whereby the member is capable of being orientated by rotating the casing.

11. Apparatus as claimed in claim 1 and including motor means arranged to vary the orientation of the member in the borehole.

12. Apparatus as claimed in claim 11 wherein the member includes anti-rotation means.

13. Apparatus as claimed in claim 11 wherein the member includes anti rotation means comprised by spring-loaded whiskers.

14. Apparatus as claimed in claim 1 wherein the anchor module includes spring-loaded arms adapted to be retracted when the module is moved in a preferred direction of travel through the casing but to open out on emerging from the casing and grip a surrounding wall of the borehole so as to resist motion opposite said preferred direction.

15. Apparatus as claimed in claim 14 wherein there are two pairs of spring-loaded arms mounted radially around a rigid member.

16. Apparatus as claimed in claim 14 and including pump up seal means.

17. Apparatus as claimed in claim 1 and including a ball valve in the member to control the flow of grout material to and around the member.

18. Borehole apparatus comprising a tubular open ended casing arranged in use to extend partially into a borehole, a breech assembly adapted for connection to a part of the said casing extending from the borehole; rope means; anchor means connected to one end of said rope means; a member adapted for connection to the rope means upstream of the anchor means; signal cable means; the signal cable means being connected to conduct signals between the member and a location remote from the member, and valve means in the breech assembly arranged to control the passage of the anchor means and the member into the casing.

19. Apparatus as claimed in claim 18 including a plurality of members attached to the signal cable at required distances along its length.

20. Apparatus as claimed in claim 18 wherein each valve member has a pair of centrally engaging jaws, each jaw having a recess arranged so that the jaws, when engaged, provide a central aperture through which the signal cable can pass.

21. Apparatus as claimed in claim 20 and including threaded control means on the jaws so arranged as to open or close the jaws when operated.

22. Apparatus as claimed in claim 18 wherein the member includes a geophone.

23. Apparatus as claimed in claim 18 wherein the member includes inclinometer means to determine the orientation of each member.

24. Apparatus as claimed in claim 18 wherein the member includes leaky seals.

25. Apparatus as claimed in claim 18 and including motor means arranged to vary the orientation of the member.

26. Apparatus as claimed in claim 18 wherein the member includes anti-rotation means comprised by spring-loaded whiskers extending from the member.

27. Apparatus as claimed in claim 18 wherein the anchor means includes spring-loaded arms adapted to be retracted when the module is moved in a preferred direction of travel through the casing but to open out on emerging from the casing.

28. Apparatus as claimed in claim 18 wherein the anchor means includes pump up seal means and a ball valve.

29. Apparatus as claimed in claim 18 and including a pumping circuit connected to the breech assembly through valve means and to a grout tank, the value means being arranged to control the flow of grout from the tank through the breech assembly.

* * * * *